(No Model.) 2 Sheets—Sheet 1.
G. H. MOORE.
COLLECTING TUBE FOR FILTERS.
No. 493,938. Patented Mar. 21, 1893.
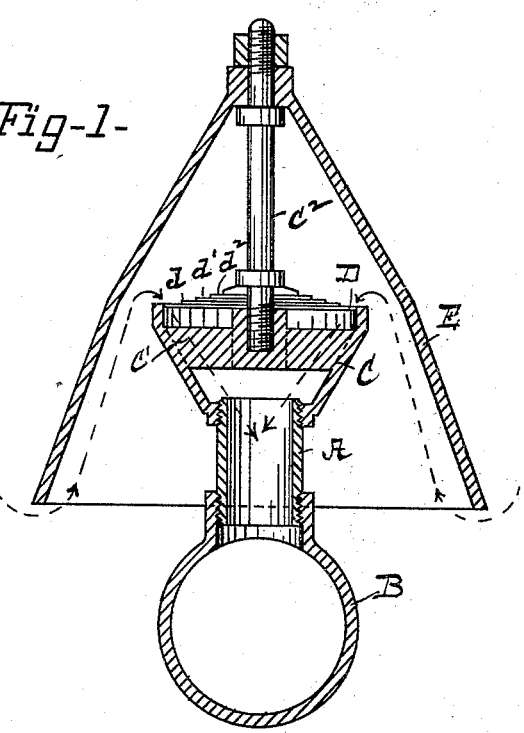
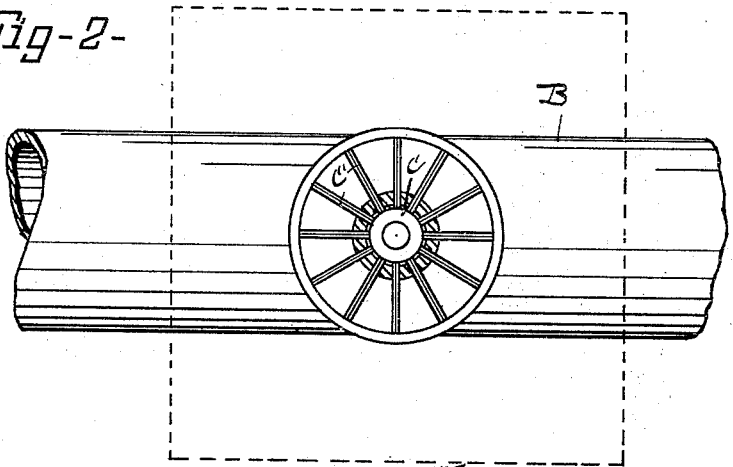
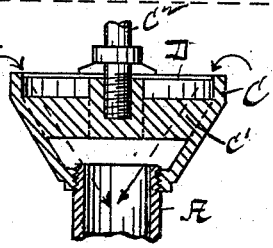
Witnesses
Francis W. Rice.
E. H. Zabriski
Inventor
George H. Moore
By Hawes & Chapman
Attorneys (No Model.) 2 Sheets—Sheet 2.
G. H. MOORE.
COLLECTING TUBE FOR FILTERS.
No. 493,938. Patented Mar. 21, 1893.
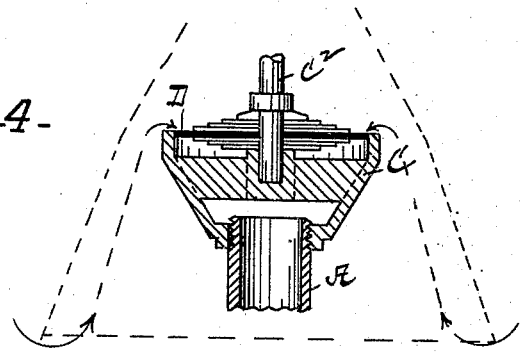
Fig-4-
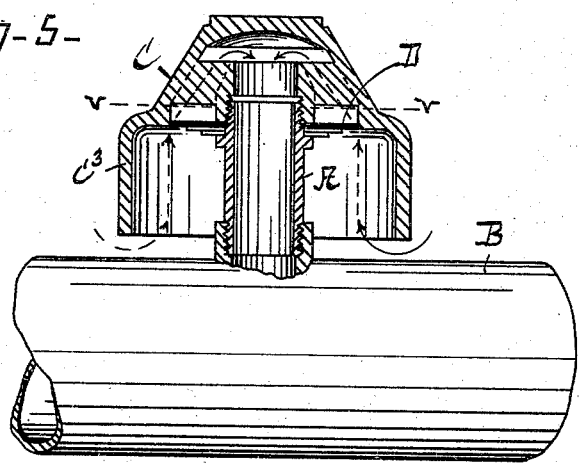
Fig-5-
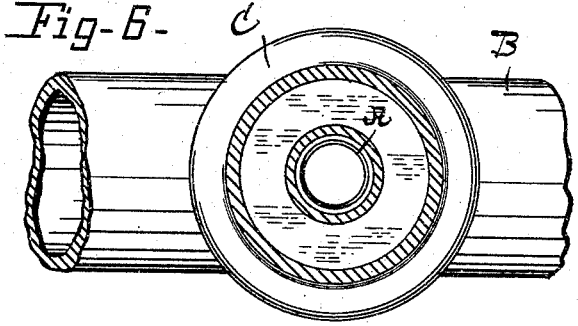
Fig-6-
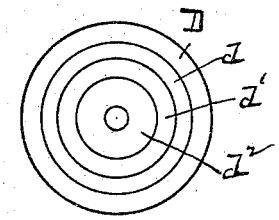
Fig-7-
Witnesses
Francis W. Rice
E. H. Salter
Inventor
George H. Moore
By Hawes & Chapman
Attorneys

UNITED STATES PATENT OFFICE.

GEORGE H. MOORE, OF NORWICH, CONNECTICUT.

COLLECTING-TUBE FOR FILTERS.

SPECIFICATION forming part of Letters Patent No. 493,938, dated March 21, 1893.

Application filed March 23, 1892. Serial No. 426,049. (No model.)

*To all whom it may concern:*

Be it known that I, GEORGE H. MOORE, of Norwich, in the county of New London and State of Connecticut, have invented a new and useful Improvement in Collecting-Tubes for Filters, of which the following, taken in connection with the accompanying drawings, is a specification.

My invention relates to the devices used to form passageways for filtered water, in one direction, and cleansing water, in the opposite direction, between the filtering chamber or compartment of a filter containing the filtering medium, and conducting pipes arranged at the bottom of said chamber, or between said chamber and a separate compartment of the filter, as the case may be. It is essential that the passageways or collecting tubes, as they are called, shall be so constructed that they will afford a free passage for filtered water during the process of filtration, while preventing the passage therethrough of granular or other particles composing the filtering medium, and that they will also afford a free passage for the reverse current of cleansing water during the operation of washing the filtering medium, when the latter becomes fouled by the organic and other matter eliminated from the water during filtration. As tending to secure these results it has been customary to make such tubes of perforated metal, and to inclose them within a screen of wire gauze or very finely perforated metal, which will prevent the particles of filtering material from entering the tube. Such form of tube is objectionable because of the tendency of the screen to soon wear out; because when unfiltered water is used to wash the filtering material, any fibrous or other matter contained therein is forced by the velocity of the reverse current into the perforations in the screen, and soon clogs the latter to such an extent as to materially impair their capacity to deliver filtered water; and because the capacity of such tubes to admit the passage of water therethrough is, at best, a fixed one, no provision being made therein for varying the size of the passage according to the pressure existing upon the liquid and thereby enabling a greater quantity of water to pass therethrough during the washing operation than during filtration, to provide for quickly performing the said washing operation. These and other objections to the use of screened tubes have led me to devise, heretofore, a form of collecting tube, in which the tube proper is imperforate and is combined with a conical or pyramidal hood which wholly incloses said tube but has an open waterway beneath its base and between its inner surface and the tube, whereby the water, during filtration, is caused to pass beneath the base of the hood, and thence upwardly within the latter to the mouth of the tube, the sloping inner surface of the hood effectually preventing the particles of filtering material from rising to the mouth of the tube and escaping therethrough. Such form of collecting tube forms the subject of an application for Letters Patent filed by me on the 22d day of March, 1892, and Serial No. 426,009, and while it successfully overcomes the objections incident to the use of screens of perforated metal, so far as their short duration and liability to become clogged are concerned, it is itself open to the further objection above stated, viz: that its waterway is of fixed dimensions with no capacity for varying the size thereof.

It is the object of my present invention to provide a collecting tube which will be provided with means for normally closing its waterway, which means is adapted to yield to pressure exerted thereon in either direction, that is to say, by the filtered water on the one hand, or by the cleansing water, on the other, to open said waterway.

A further object of my invention is to provide a collecting tube which will be capable of automatically increasing the size of its waterway with an increase in pressure exerted thereon in either direction.

To these ends my invention consists in a collecting tube having applied thereto in such manner as to normally close its waterway a flexible or elastic disk, diaphragm or plate, as hereinafter fully described and particularly pointed out in the claims.

Referring to the drawings in which like parts are designated by like letters in the several views, Figure 1 is a vertical sectional view of a collecting tube embodying my invention, and a cross-section of the pipe to which it is attached. Said figure also shows in vertical section a hood or guard applied to the tube, as the same will preferably be arranged in practice. Fig. 2 is a plan view of the tube and its mouth-piece, the elastic disk being removed and the outline of the base of the hood or guard being indicated by broken lines. Fig. 3 is a vertical sectional view of a slightly different arrangement of the elastic disk with respect to the tube. Fig. 4 in a similar view, shows still another arrangement of said parts. Fig. 5 in a like view, shows the mouthpiece inverted upon the tube. Fig. 6 is a horizontal section taken upon line $v-v$ of Fig. 5. Fig. 7 is a plan view of the series of elastic disks preferably employed in connection with the mouth-piece.

The letter A designates the tube proper which at its lower end may be screwed into pipe B, a series of which pipes are usually disposed horizontally within and at the bottom of, the filtering chamber of large filters; or may be screwed or otherwise secured in the false bottom in such filters as have a false bottom separating the filtering chamber from a water collecting compartment located between said false bottom and the true bottom, in lieu of said pipes. In either case, the tubes A project upwardly into the mass of filtering material within the filtering chamber, and serve as the conduits for filtered water from said chamber and for cleansing water to said chamber, in a manner familiar to persons skilled in the art. In constructing said tube according to my invention, I prefer to provide it, at its upper end, with a mouthpiece C, screwed thereon as shown, or otherwise rigidly secured thereto, which mouthpiece is preferably made frusto-conical in shape, as shown. At or near its outer end, or end of greatest diameter, the mouthpiece C is provided with a central hub $c$ which hub is united to the body of the mouthpiece by a series of radially disposed ribs $c'$ the outer sides of which are depressed beneath the plane of the outer ends of the hub and body, in such manner as to leave an annular open space surrounding said hub, as shown. An open waterway is thus formed between the ribs of said mouthpiece, which communicates directly with the bore of tube A. For the purpose of normally closing said waterway, I utilize a flexible or elastic disk, diaphragm or plate D, which is preferably made of sheet brass or other thin and elastic material, is supported at its center upon hub $c$ by a threaded bolt $c^2$ passing therethrough into a tapped hole in said hub, as shown, or in any other convenient manner; and is of such diameter that, when free from pressure, it will make contact with the inner surface of the mouthpiece at the outer end of the latter, while being free to rise or fall at its periphery, as pressure is exerted thereon in either direction. Being thus supported at its center, the disk D is adapted to yield in either direction as pressure is exerted thereon by the filtered water, on the one hand, or by the cleansing water, on the other; and to open the waterway of the tube more or less as the pressure exerted thereon increases or diminishes. A perfectly automatic regulator of the size of the waterway afforded by the tube is thus provided.

As shown in Fig. 3, the disk D is used alone, but for the purpose of reinforcing its elasticity I prefer to use in connection therewith additional elastic disks or leaves $d, d', d^2$ &c. applied thereto upon one side only, as shown in Fig. 1, or on both sides as shown in Fig. 4, in the latter of which the action of the disk D will be reinforced in both directions.

In Fig. 1 I have illustrated the novel form of tube in connection with the conical or pyramidal hood described and claimed in my previous application hereinbefore referred to, which hood is designated by the letter E. While the elastic disk would of itself tend to prevent the escape through the tube of the particles composing the filtering medium, I prefer to employ in connection therewith said hood E and thus entirely prevent such escape of said particles. As shown, the hood is mounted at its upper end upon bolt $c^2$ which is extended for that purpose, but it may have in connection therewith suitable feet or standards supporting it at the bottom, or be supported entirely upon such feet in such manner as to leave an open waterway beneath its base. The course taken by the filtered water beneath said hood and into and through tube A, is indicated by arrows in Figs. 1 and 4. The cleansing water follows a reverse course and issues from beneath the hood at the bottom of the entire mass of filtering material, lifting and thoroughly cleansing the latter, as is clearly described in my aforesaid previous application.

In Figs. 5 and 6, I have illustrated the mouthpiece and disk as being inverted upon the tube, the disk D being supported between the hub of said mouthpiece and a flange or collar on the tube. The mouthpiece, in this instance, is closed at its upper end, and preferably has a depending annular flange $c^3$, which flange performs the function of the hood E in the previously described forms and, therefore, enables the latter to be dispensed with.

In each of the forms shown, it will be observed, the unity of a collecting tube having applied to its mouth an elastic device which normally closes said mouth but which, by its elasticity, is adapted to yield to pressure in both directions to open said mouth, is preserved.

The rate at which the tubes constructed as herein shown and described, will deliver filtered water during the process of filtration, will obviously depend upon the degree of pressure existing upon the water within the filtering chamber, but, I have found that even in low pressure filters, where the existing pressure is due to gravity merely, better results can be obtained from this form of tube, in the service of filtering water, than with the perforated tubes covered with a screen, hereinbefore referred to. During the washing operation such advantage is greatly increased, as the capacity of the tube to automatically increase its waterway with increased pressure, enables me to thoroughly cleanse the filtering material in about one-half the time heretofore required therefor. Moreover, I am enabled to use unfiltered water as the washing medium since any fibrous or other matter contained therein, instead of lodging in the perforated screen, as heretofore, passes freely into the filtering chamber and thence out through the waste pipe. The waterway is thus kept perfectly clear at all times and both the quantity and the quality of the filtered water are enhanced.

By the term "elastic" as herein applied to the disk D I wish to be understood as meaning the property of said disk to resume its normal plane when deflected from said plane, at or near its periphery, by pressure exerted thereon in either direction.

Having thus fully described my invention, what I claim, and desire to secure by Letters Patent, is—

1. The collecting tube for filters herein described having applied to the mouth thereof a yielding plate whose diameter is substantially that of said mouth, whereby said plate will normally close said mouth but will be free to yield in both directions, substantially as and for the purpose described.

2. The collecting tube herein described having applied to the mouth thereof an elastic disk, said disk being supported at its center in position to normally close said mouth and having its periphery free to yield in either direction to pressure exerted thereon, substantially as and for the purpose set forth.

3. The collecting tube for filters herein described, having a flaring mouthpiece and having an elastic disk centrally supported at the outer end of said mouthpiece, the diameter of said disk corresponding substantially with the inner diameter of the mouthpiece at said outer end, whereby said disk will normally close the end of said mouthpiece while its periphery will be free to yield in either direction to open said mouthpiece, arranged and operating substantially as set forth.

4. The collecting tube for filters herein described, the same consisting of a tube having at one end thereof a flaring mouthpiece and having at the outer end of said mouthpiece a central hub and a series of radially disposed ribs connecting said hub to the body thereof, the outer ends of said hub and body projecting beyond the outer surface of said ribs, combined with an elastic disk centrally supported upon said hub, arranged and operated substantially as and for the purpose set forth.

5. The combination with tube A having the elastic disk D normally closing the mouth thereof, of hood E superposed upon said tube, substantially as and for the purpose described.

6. The combination with pipe B of tube A entering said pipe at one end and having at its opposite end mouthpiece C, said mouthpiece having at its outer end hub c and ribs c' the outer surface of which is depressed beneath the plane of the outer end of said hub, and elastic disk D centrally secured upon said hub, substantially as described.

7. The combination with the tube A having mouthpiece C provided with hub c and ribs c', of a series of elastic disks of varying diameters centrally secured upon said hub, substantially as and for the purpose set forth.

GEORGE H. MOORE.

Witnesses:
W. H. CHAPMAN,
E. H. LATHROP.